United States Patent
Bartzke et al.

(10) Patent No.: US 7,400,433 B2
(45) Date of Patent: Jul. 15, 2008

(54) INSTALLABLE PINHOLE

(75) Inventors: Karlheinz Bartzke, Gotha (DE); Ralf Wolleschensky, Apolda (DE); Karl-Heinz Klopfleisch, Jena (DE); Jens Hofmann, Apolda (DE)

(73) Assignee: Carl Zeiss MicroImaging GmbH, Jena (DE)

( * ) Notice: Subject to any disclaimer, the term of this patent is extended or adjusted under 35 U.S.C. 154(b) by 0 days.

(21) Appl. No.: 11/926,435

(22) Filed: Oct. 29, 2007

(65) Prior Publication Data

US 2008/0049294 A1 Feb. 28, 2008

Related U.S. Application Data

(63) Continuation of application No. 10/669,394, filed on Sep. 24, 2003, now Pat. No. 7,324,253.

(30) Foreign Application Priority Data

Sep. 24, 2002 (DE) ................. 102 44 850

(51) Int. Cl.
 *G02B 26/02* (2006.01)
(52) U.S. Cl. .................. 359/232; 359/233; 359/227
(58) Field of Classification Search ............. 359/232, 359/233, 227
 See application file for complete search history.

(56) References Cited

U.S. PATENT DOCUMENTS

| | | | |
|---|---|---|---|
| 2,964,998 A | 12/1960 | Middlestadt | |
| 3,717,401 A | 2/1973 | Powell | |
| 4,017,162 A | 4/1977 | Mills | |
| 4,880,294 A | 11/1989 | Brakenhoff | |
| 5,400,170 A | 3/1995 | Hanada | |

FOREIGN PATENT DOCUMENTS

| | | |
|---|---|---|
| DE | 42 12 077 | 1/1994 |
| DE | 202 05 079 | 7/2002 |
| DE | 101 32 119 | 1/2003 |
| EP | 0 276 337 | 8/1988 |
| EP | 0 280 375 | 8/1988 |
| EP | 0 362 700 | 4/1990 |
| GB | 1248825 | 10/1971 |

OTHER PUBLICATIONS

Patent Abstracts of Japan, Publication No. 09159935 published Jun. 20, 1997 (Japanese Application No. 07323032 (Olympus Optical Co., Ltd.).
Patent Abstracts of Japan, Publication No. 04358110 published Dec. 11, 1992 (Japanese Application No. 03134181 (Olympus Optical Co., Ltd.).

*Primary Examiner*—Ricky L Mack
*Assistant Examiner*—Jack Dinh
(74) *Attorney, Agent, or Firm*—Reed Smith LLP

(57) ABSTRACT

Adjustable pinhole, particularly for the illumination beam path and/or detection beam path of a laser scanning microscope, wherein the pinhole is defined by foil edges which are adjustable relative to one another, and at least two foils, each with at least one straight edge, are advantageously arranged relative to one another and/or connected to one another in such a way that their edges describe an L-shape and the L-shaped connection pieces are arranged on one another in such a way that they define a rhombic or square light passage and they are moved relative to one another for adjusting the pinhole.

2 Claims, 6 Drawing Sheets

INSTALLABLE PINHOLE

CROSS-REFERENCE TO RELATED APPLICATIONS

This application is a continuation application of Ser. No. 10/669,394 filed Sep. 24, 2003 now U.S. Pat. No. 7,324,253, which claims priority of German Application No. 102 44 850.7, filed Sep. 24, 2002, the complete disclosure of which is hereby incorporated by reference.

BACKGROUND OF THE INVENTION a) Field of the Invention

The invention relates to an installable pinhole which may be used in optical instruments such as a laser scanning microscope or the like.

b) Description of the Related Art

A scissor-like closure mechanism for a pinhole is described in DE 20205079 U1. Above all, in this connection, the manufacturing accuracy of the angle points which are located opposite one another and which are to be moved relative to one another over the axis of rotation pose a serious obstacle to a reproducible, light-tight closure and exact square shape of the pinhole aperture.

OBJECT AND SUMMARY OF THE INVENTION

It is the primary object of the invention to develop a highly accurate pinhole which can be closed in a light-tight manner and whose aperture has a square shape at values above zero.

According to the invention, this object is met in that an arrangement of foil edges, whose edges facing toward the pinhole aperture are preferably ground, are moved relative to one another according to the inventive constructions. The decisive advantage in forming the pinhole aperture from foil edges consists in that the corners of the pinhole aperture are entirely sharp-edged and the radius of curvature of the corners is zero. This allows pinhole apertures to be adjusted in a reproducible manner upward from zero.

The foil edges can be manufactured in a highly precise manner beforehand, for example, by cutting with diamond cutting edges or by laser cutting or etching.

For the purpose of the preferable movement which should be carried out in a very exact manner so as to be free from play, solid joints are provided in the form of flexible webs at which tilting or rotation occurs.

Surprisingly, the invention permits an adjustable and reproducible reduction in the size of the pinhole aperture from a zero value and light-tight closure thereof without the risk of the foil edges colliding with one another.

The invention will be described more fully in the following with reference to the schematic drawings.

BRIEF DESCRIPTION OF THE DRAWINGS

In the drawings:

FIG. 3 shows an arrangement of the pinhole adjustment with reference to the arrangement according to FIG. 1a;

DESCRIPTION OF THE PREFERRED EMBODIMENTS

By foil pieces or foil edges is meant hereinafter essentially the edges located opposite one another when opening and/or closing the pinhole aperture, while the rest of the shape of the foil pieces may vary depending on space requirement and construction.

The foil material can be, e.g., spring steel, spring bronze or aluminum having a thickness of 10 µm, for example. The foil edges can be ground in a composite of, e.g., one hundred individual pre-manufactured foils and punched and then severed or used in the as-delivered state as strip material.

Figure 1A:
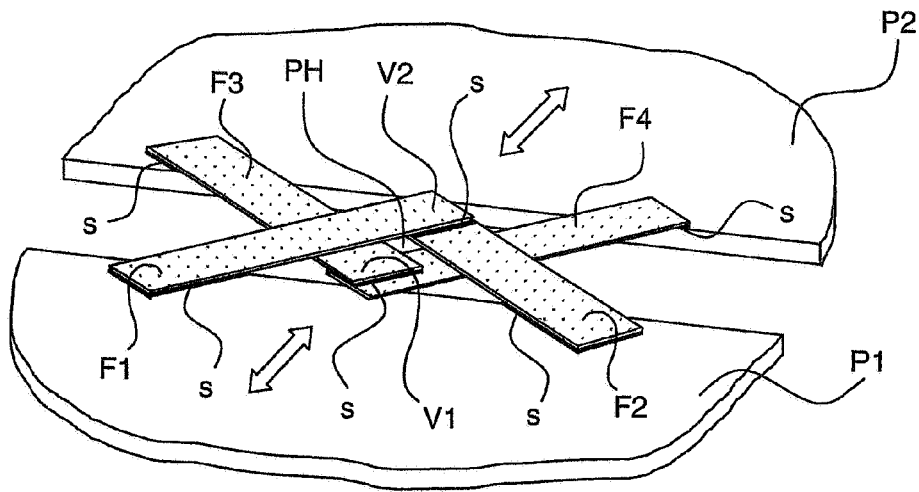
FIG. 1a is a schematic description of foil pieces in accordance with the invention.

FIG. 1a schematically shows an illustration of foil pieces F1-F4 which are arranged preferably at right angles in an L-shaped manner; F1; F2 and F3; F4 are fixedly connected with one another at connection points V1, V2. They are fastened in a stationary manner by their ends remote of the connection points (indicated in black by s) to base plates P1 and P2 which are displaceable relative to one another in the direction indicated by the arrows; specifically, they are fastened on each plate in such a way that the pinhole aperture opens and closes in a punctiform manner in the direction indicated by the arrows during the synchronous movement of the plates P1 and P2. The foils can be connected with one another and with the plates P1 and P2, for example, by gluing, resistance welding, diffusion welding or ultrasonic welding.

As a result of the synchronous displacement of the plates P1 and P2 in the direction indicated by the arrows, the aperture area between the foil edges connected at points V1, V2 is reduced or enlarged; specifically, pinhole PH is opened when plates P1, P2 approach one another, and vice versa. The pinhole aperture preferably closes in a square manner until becoming a point. When the distance between the plates P1, P2 is further increased, the pinhole aperture is covered in a light-tight manner without the foil edges obstructing or damaging one another.

Due to the fact that each two foil edges are fastened at right angles one above the other, it is ensured that the right angle formed by them is not subject to any manufacturing problems. The foil edges are prevented from locking up or catching in that F3 is fastened to F4 in a shortened manner and therefore does not contact the foil edge of F2.

Figure 1B:
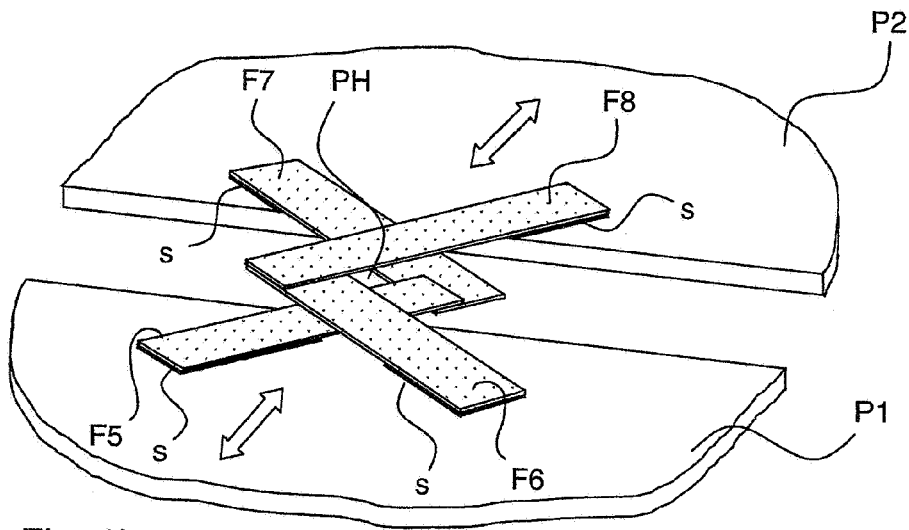
FIG. 1b shows, in schematic form, another variant of the invention.

FIG. 1b shows another variant of the invention. It is formed of cross-shaped foil edges F5-F8 which are arranged in a cross-shaped manner and which are fastened to plates P1 (F5, F6) and P2 (F7, F8), respectively. Two plates P1; P2 are displaceable relative to one another in the direction indicated by the arrows. However, in this case when P1, P2 approach one another the pinhole PH closes, and vice versa, because F5-F8 and F6-F7 slide over one another in a scissor-like manner, since they are not connected to one another. The aperture of the pinhole is formed in this case by the respective corners of the foil arrangements remote of the plate edges.

Figure 1C:
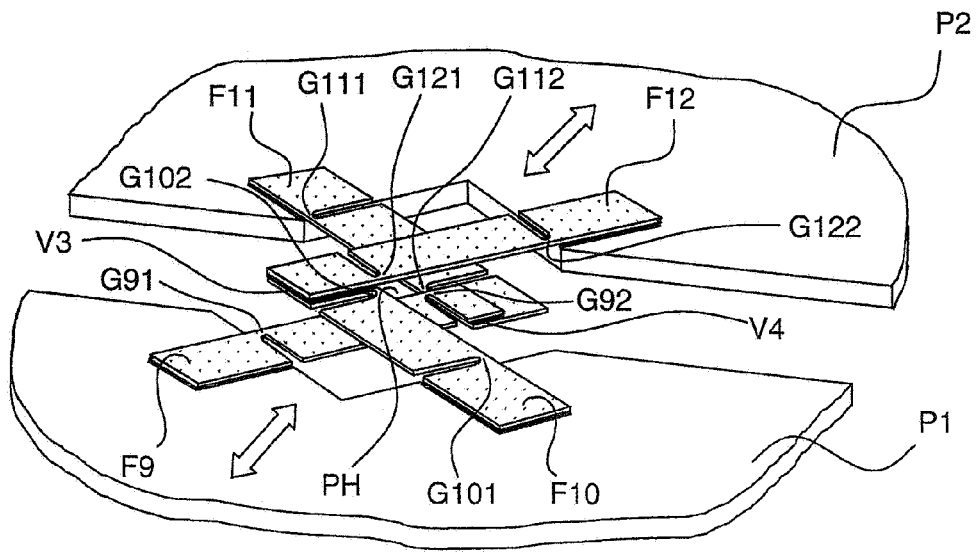
FIG. 1c shows again, in schematic form, another variant of the invention.

FIG. 1c shows another variant of the invention. Each of the foil edges F9, F10, F11, F12 has two joints, preferably solid-state joints. The distance between the articulation points G91 to G92, G101 to G102, G111 to G112, and G121 to G122 is preferably identical and much larger than the pinhole aperture. Each pair of foils F9, F11 and F10, F12 is connected in an L-shaped manner at their connection points V3 and V4 and is fastened in a cross-shaped manner to plates P1, P2 in such a way that the pinhole aperture closes in a punctiform and preferably square-shaped manner, and vice versa, when plates P1 and P2 open synchronously in the direction indicated by the arrows. This is carried out in that when the distance between plates P1, P2 is increased synchronously in the direction indicated by the arrows the articulation points G92 and G102, G112 and G121 move toward one another perpendicular to the direction indicated by the arrows and close the pinhole aperture, and vice versa. In so doing, the flexible articulation notches at the foils open and close. The shape of the pinhole aperture remains approximately square when opening and closing the pinhole. When the distance between plates P1, P2 increases, the pinhole aperture is finally covered in a light-tight manner without the foil edges obstructing or destroying one another.

The foil edges are prevented from catching in that F9 is fastened to F11 in a shortened manner and therefore does not come into contact with foil edge F12.

Figure 2A:
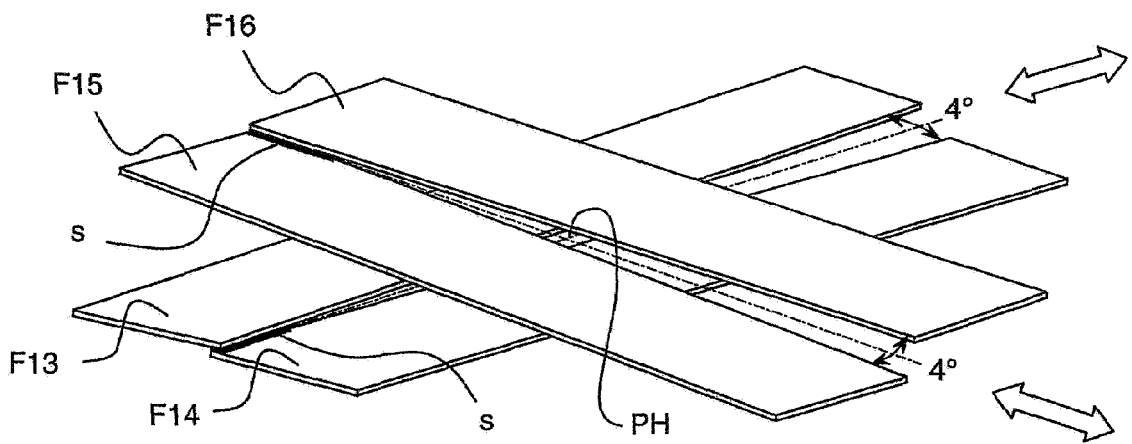
FIGS. 2a, 2b and 2c show, in schematic form, three different variants of a second construction in accordance with the invention.

FIG. 2 shows a new construction, wherein every two foil edges F13, F14, F15, F16 are arranged in a slightly V-shaped manner relative to one another by pairs, i.e., they enclose a small angle relative to one another. In FIG. 2a, one pair of foils is synchronously displaced relative to the other with respect to its center axis between the individual foils, preferably perpendicular to one another in the direction indicated by the arrows. A perpendicular relative displacement, preferably by synchronous movement of both pairs of foils by means of two motors (not shown) results in large adjusting paths when adjusting the pinhole aperture with high accuracy, so that path measuring systems can be dispensed with, as the case may be.

Figure 2B:
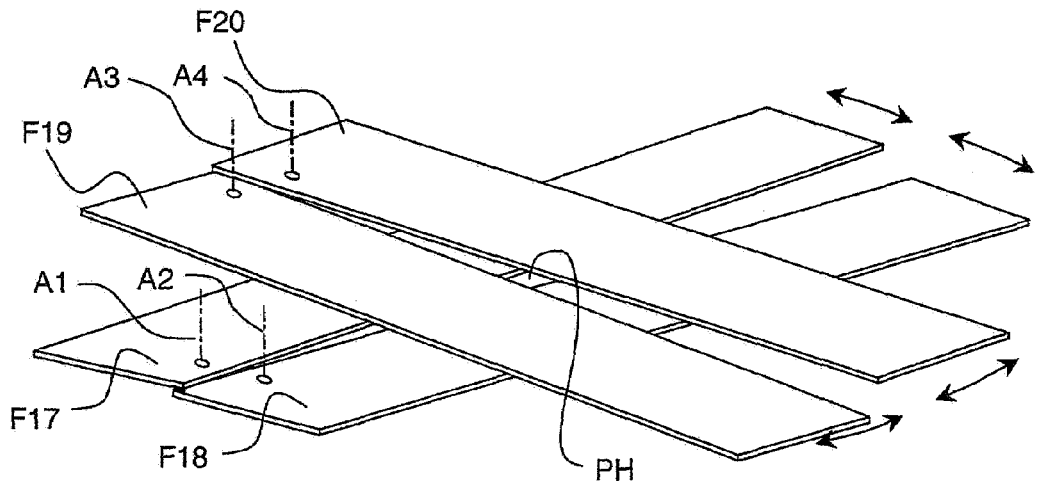

In FIG. 2b, the slightly V-shaped aperture angle between the foil edges is varied in that the foils F17 and F18 are rotated around axes A1 and A2 and foils F19 and F20 are rotated around axes A3 and A4 in opposite directions and preferably synchronous with the opening and closing of the pinhole aperture.

Figure 2C:
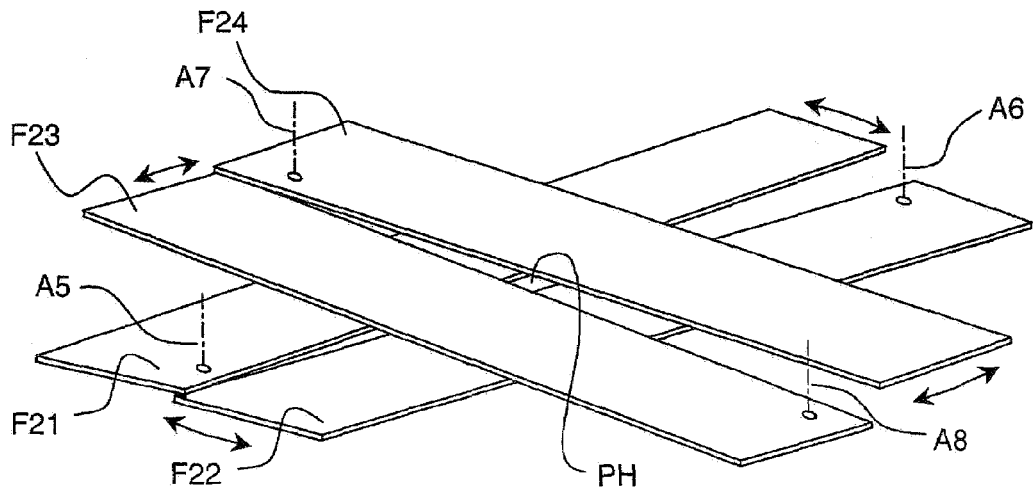

In FIG. 2c, the axes of rotation A5, A6 and A7, A8 are on the opposite sides of the pairs of foils F21, F22 and F23, F24. The rotation of the foils is preferably carried out synchronously and in the same direction.

Figure 3:
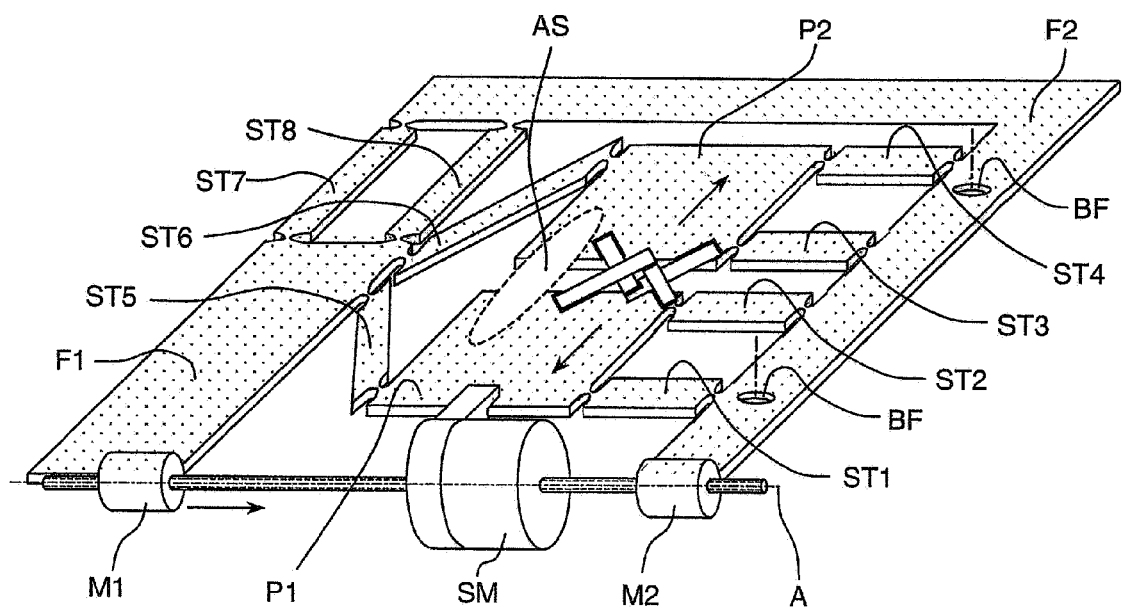

FIG. 3 shows an arrangement for pinhole adjustment with reference to the arrangement of the foil edges according to FIG. 1a. However, the displacement of the plates P1, P2 can be carried out in an analogous manner when using the foil edge arrangement according to FIGS. 1b, c. The stepping motor SM shown here is fixed with respect to rotation only at the plate P1 and drives spindles SP1 and SP2 which have threads with different pitches and which, by means of nuts M1 and M2, cause the guide part F1 connected to P1 and P2 to move perpendicular to the displacing movement of P1, P2. Parts F and P are preferably formed of one piece and are connected together by springing webs (parallel spring joints). The parts can be manufactured, for example, by laser cutting, etching, erosion or punching.

The stepping motor SM is arranged so as to be fixed with respect to rotation and freely displaceable relative to plate P1. It synchronously drives the spindles SP1 and SP2 having threads with different pitch (e.g., threads M3×0.5 and M2, 6×0.45 result in a pitch difference of 50 μm).

Spindle SP2 is driven by stepping motor SM so as to screw into the nut M2 fastened to the frame F2, whereupon the stepping motor SM which is fixed with respect to rotation is displaced along axis A by the spindle displacement in the direction indicated by the arrows.

Nut M1 which is fastened to the guide part F1 is displaced relative to nut M2 due to the differential thread by an amount approximately 10 times less than that of the stepping motor SM. This causes a very high sensitivity in the adjustment of F1.

The diagonal spring webs ST5, ST6 which spread apart or close when the motor shaft rotates are fastened to guide part F1 which is connected by spring webs (parallel spring joint) to the frame and open and close the plates P1, P2 and, therefore, the pinhole.

While the frame F2 is connected to plates P1, P2 for parallel guidance thereof by a plurality of webs ST1-ST4 (two parallel spring joints), plates P1, P2 are connected respectively to F1 by webs ST5, ST6 which are supported in a springing manner and which are arranged diagonal to the displacement direction of P1 and P2 and diagonal to F1, F2. In this way, a displacement of F1 in the direction indicated by the arrows is transformed into a displacement of plates P1 and P2, and the resulting adjustment of the pinhole aperture is carried out according to FIG. 1 or 2.

Figure 4:
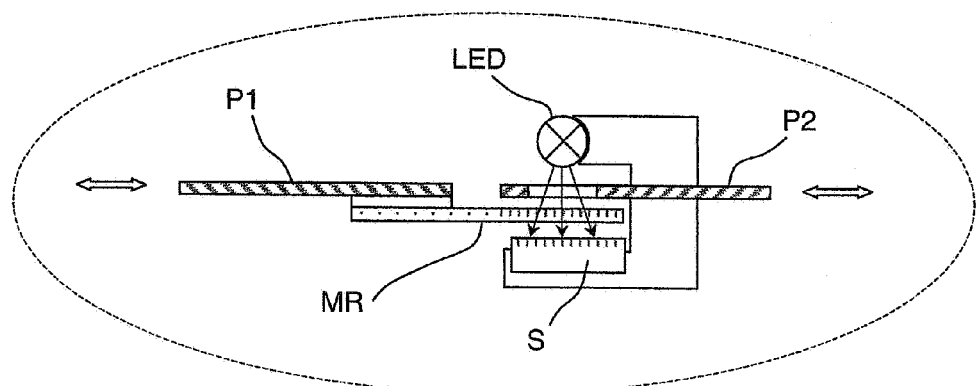
FIG. 4 shows a broken out section of the arrangement in FIG. 3 in cross-sectional schematic form.

FIG. 3 schematically shows a broken out portion AS which can accommodate a path measuring system as shown by way of example in FIG. 4. It measures the relative movement of the plates P1, P2 and, therefore, the size of the diagonals of the pinhole aperture.

A light source LED is fixedly arranged on plate P2. A spatially resolving sensor S which is located across from it on P2 and which detects the movement of a measurement scale MR, in this case a transparent grid ruler, based on the detected grid change is assigned to the light source LED. Measuring systems of this kind are commercially available with an accuracy from 0.1 μm. Commercial measuring systems of this kind make it possible, in addition, to reference the stepping motor drive.

Based on the detected relative movement of the plates P1, P2, the actual pinhole aperture can be detected online and can also be correlated with an optical measurement in different pinhole aperture states. A referencing of the stepping motor drive can also be carried out in a simple manner in that an additional optical detector, not shown, detects the light of a light source, not shown, passing through the pinhole aperture when opening the pinhole aperture and, at that time, resolves the referencing of the stepping motor drive in a highly accurate manner.

Figure 5:
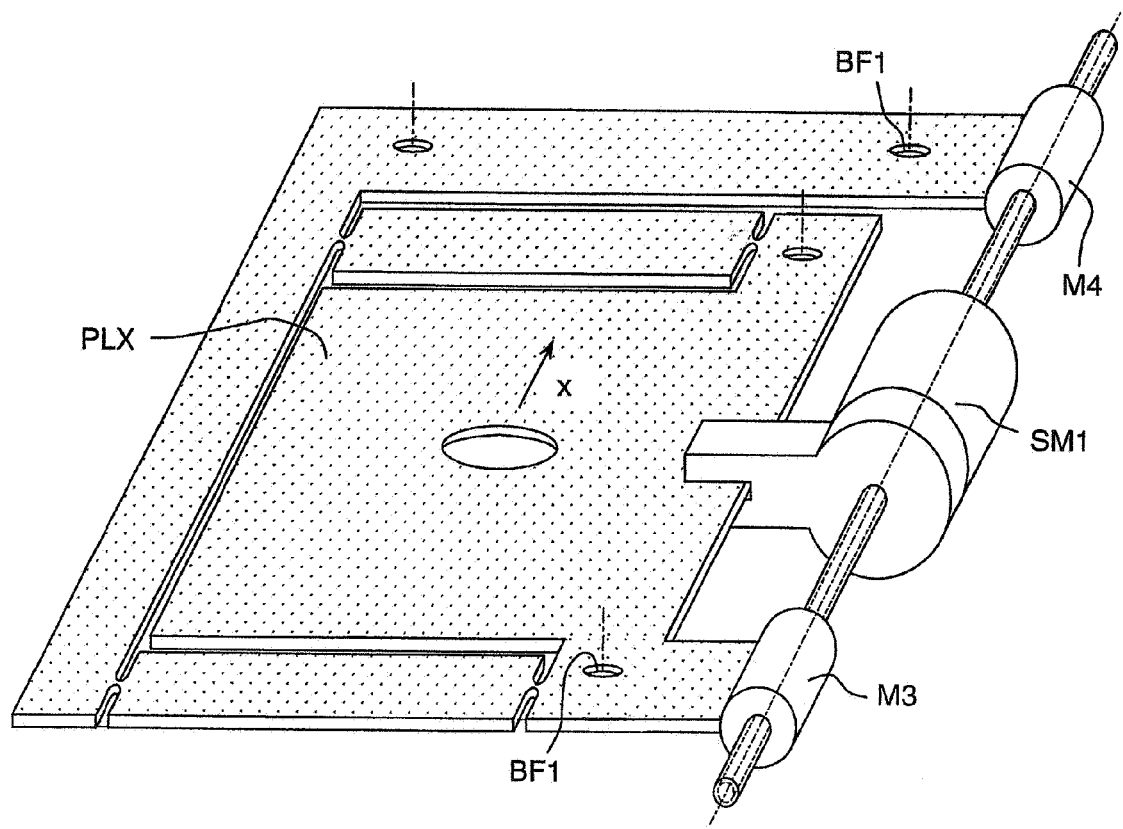
FIG. 5 shows a spindle drive in schematic form for moving a plate in the x-direction.
Figure 6:
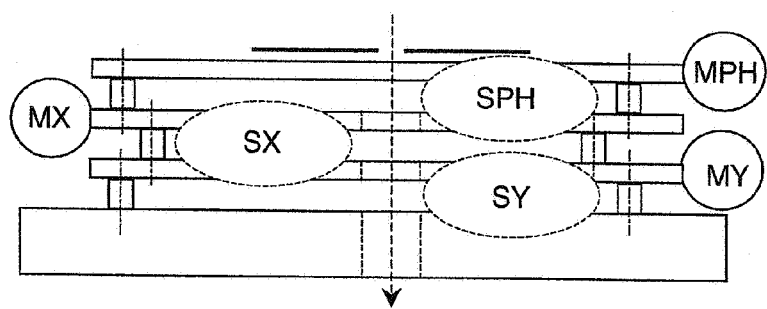
FIG. 6 illustrates another aspect of the invention in schematic form.

FIG. 5 shows a spindle drive comprising a stepping motor SM1 and nuts M3, M4 which ensures a movement of a plate PLX in x-direction. This plate is connected by fastening points BF1, for example, with fastening points BF on the displacement device according to FIG. 4, so that the entire pinhole arrangement according to FIG. 4 is displaceable in x-direction and—with another arrangement that can be connected to the arrangement according to FIG. 5—also in y-direction. This ensures an x-displacement and y-displacement of the pinhole vertical to the optical axis, for example, for centering purposes.

Figure 7A:
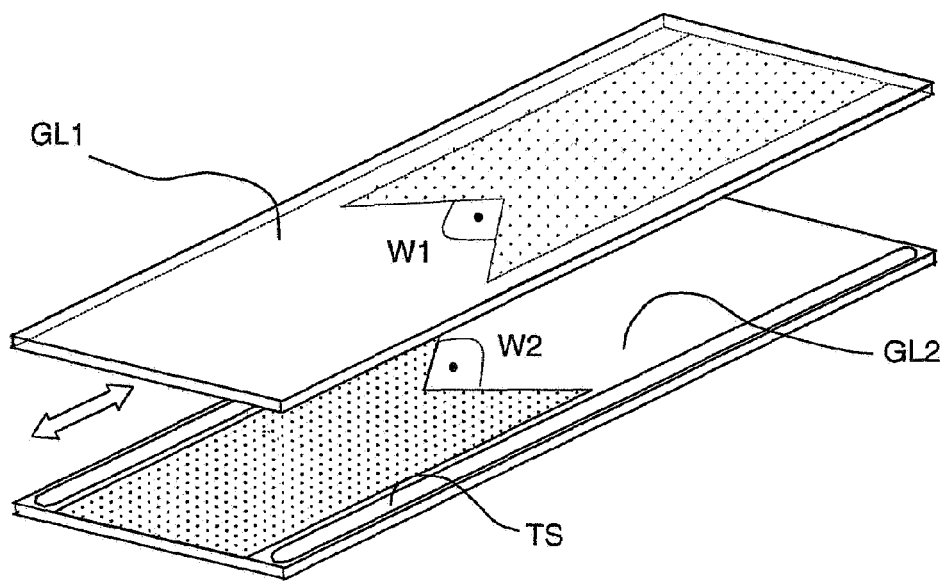
FIGS. 7a and 7b show two views, in schematic fashion, of sliding glass plates in another form of the invention for forming the pinhole.
Figure 7B:
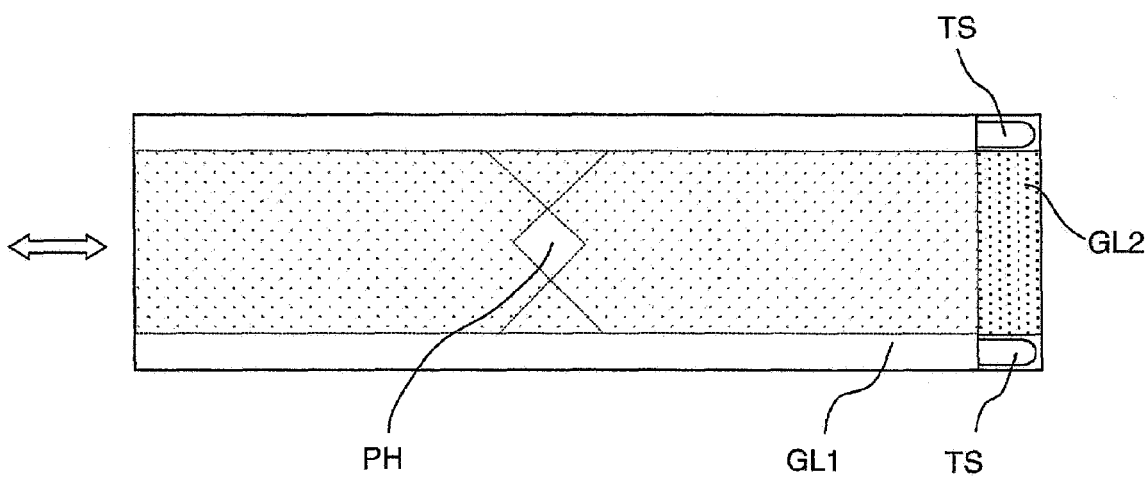

FIG. 7 shows two thin glass plates GL1, GL2 which are displaceable relative to one another, for example, object carriers of a microscope which are displaceable relative to one another in the direction indicated by the arrows and are partially coated, for example, by means of a high-precision lithography process. This coating is carried out in a mirror-symmetric manner for GL1 and GL2 in such a way that a preferably right-angled, sharp-edged angle W1, W2 of the coating remains open and forms the pinhole PH when plates GL1, GL2 are located above one another. In order that the plates do not slide directly on one another, which can damage the coating, thin Teflon strips TS can be provided on at least one plate at the edges outside the active area of the pinhole PH; the thin Teflon strips ensure frictionless sliding and are preferably oriented in the direction of displacement. Teflon slides with an almost ideal absence of friction only on a smooth glass surface. Therefore, there should not be any chrome coating on the glass plates in the area of the Teflon coating. An immersion liquid may be applied between the glass plates to prevent reflection losses at the surfaces of the glass plates GL1 and GL2 facing each other.

Figure 8A:
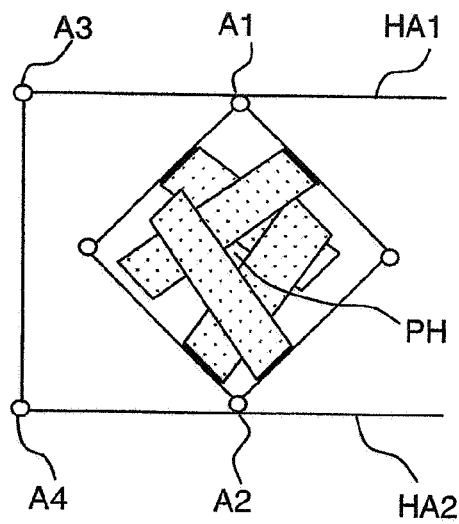
FIGS. 8a, 8b and 8c illustrate another construction of the invention in schematic form.
Figure 8B:
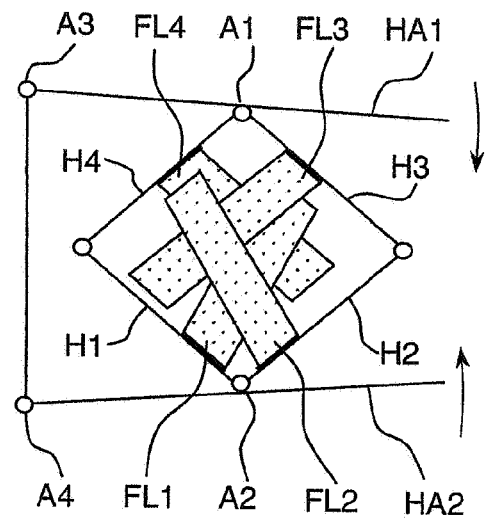

FIG. 8 shows another construction of an adjustable pinhole comprising foils FL1-FL4 arranged at lever joints H1-H4. The arrangement is based on an arrangement of the foil edges according to FIG. 2c.

The lever joints H1-H4 which are preferably of identical length are connected to one another in an articulated manner and form an adjustable rhombus. The adjustment is carried out at points A1, A2 by means of guiding together or spreading apart lever arms HA1, HA2 which are connected to A1 and A2 and which are supported at fulcrums A3, A4.

When HA1 and HA2, for example, are moved relative to one another (direction indicated by the arrows in FIG. 8b), the following rotational movements are brought about: FL1 in counterclockwise direction; FL2 in clockwise direction; FL3 in counterclockwise direction; FL4 in clockwise direction, so that two foils FL respectively move relative to one another and the pinhole is accordingly closed. When HA1 and HA2 are spread apart, this has the opposite result.

Figure 8C:
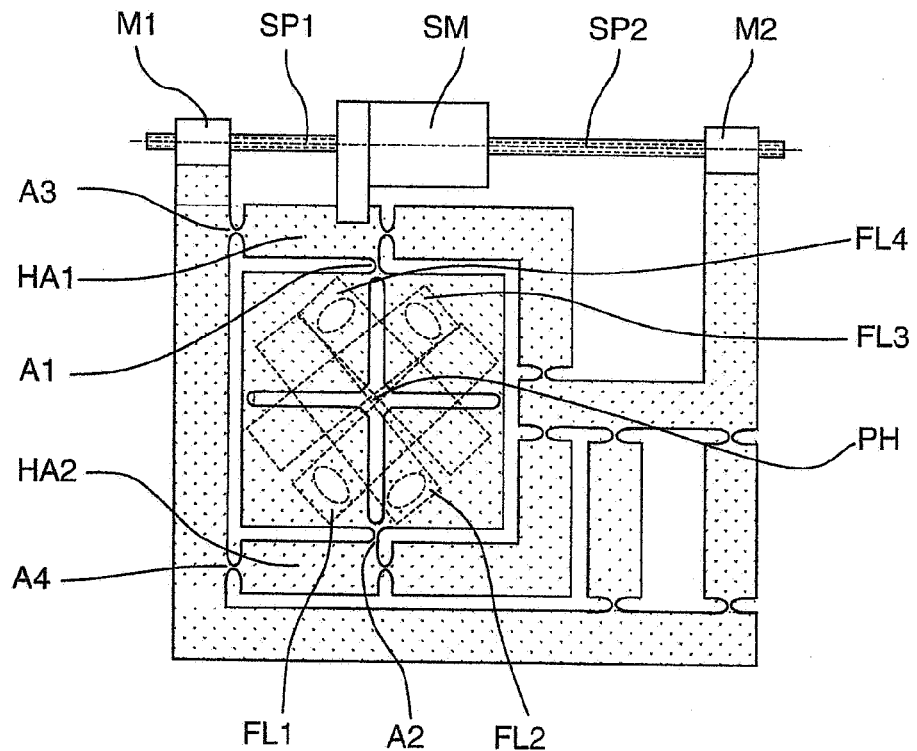

FIG. 8c shows a complete arrangement in which a pinhole adjustment can be carried out by an arrangement analogous to that shown in FIG. 3 by means of an individual stepping motor SM.

While the foregoing description and drawings represent the present invention, it will be obvious to those skilled in the art that various changes may be made therein without departing from the true spirit and scope of the present invention.

What is claimed is:

1. An adjustable pinhole for the illumination beam path and/or detection beam path of a laser scanning microscope, comprising:
    a plurality of solid state joints;
    a stepping motor for performing adjustment of said pinhole;
    a pair of spindles driven by said stepping motor, said spindles running in the same direction;
    referencing of said stepping motor drive being carried out by a path measuring system and/or an optical detector for detecting the amount of light passing through the pinhole; and
    a plurality of plates coupled to said solid state joints for forming the pinhole, said plates being driven by said stepping motor and having segments displaceable at different pitches.

2. The adjustable pinhole according to claim 1, including the partially transparent carriers which are displaced relative to one another, said carriers having coatings with angle segments which together define the pinhole.

* * * * *